Figure 3:
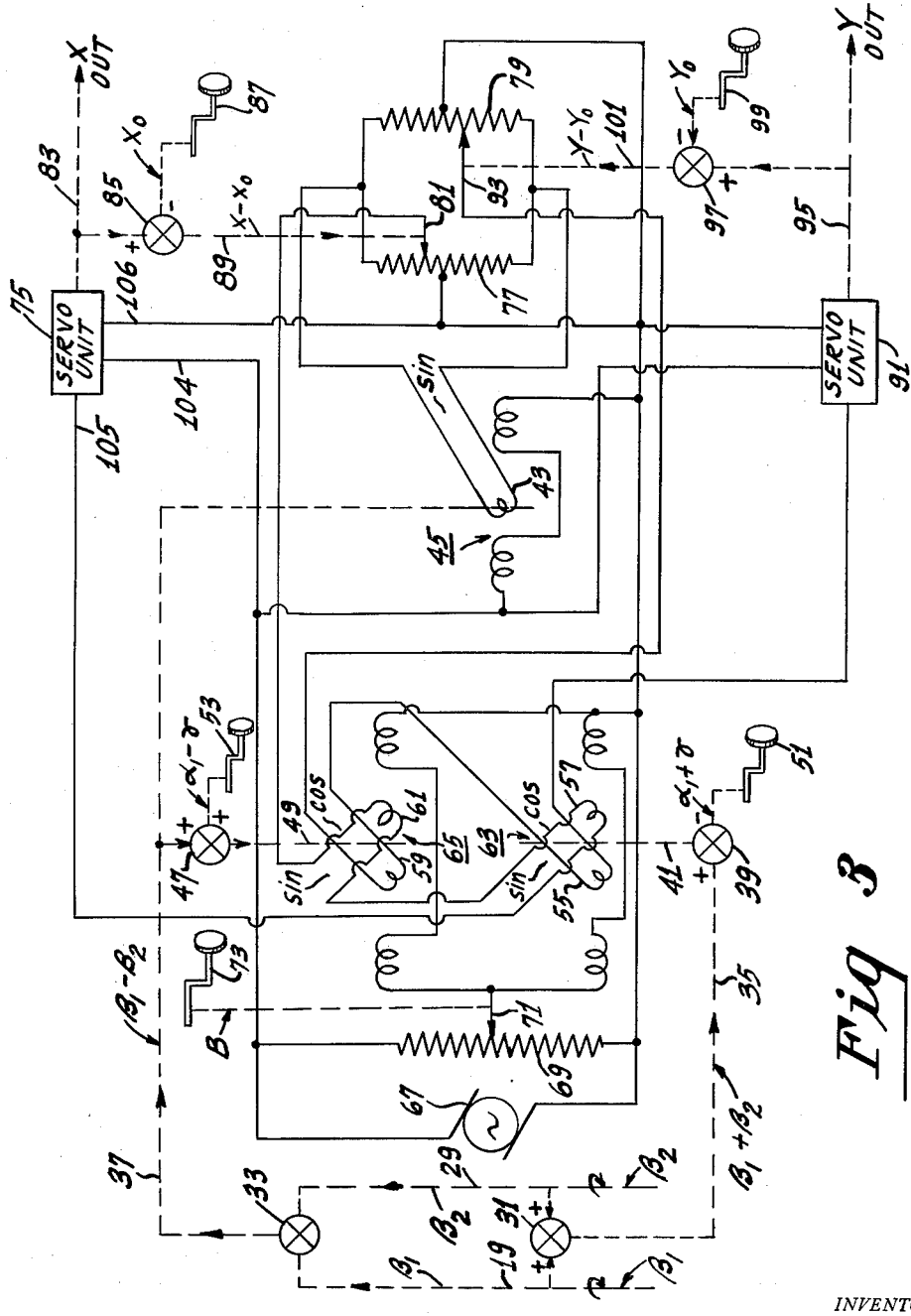

Sept. 13, 1955      D. G. C. LUCK      2,717,735
MEANS FOR LOCATING THE POSITION OF A MOBILE CRAFT
Filed June 30, 1953      2 Sheets-Sheet 1
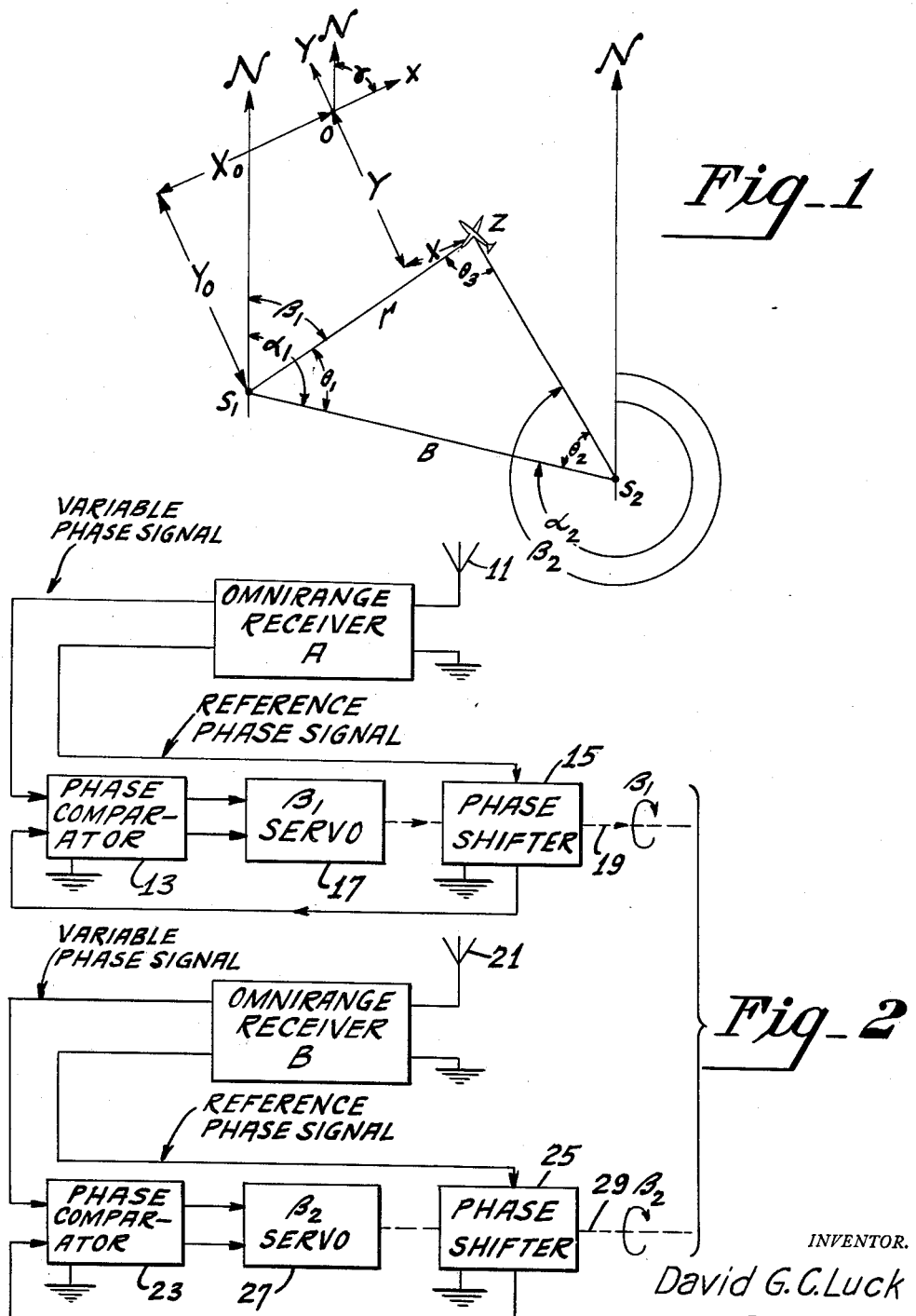
INVENTOR.
David G. C. Luck
BY
ATTORNEY United States Patent Office 2,717,735
Patented Sept. 13, 1955

2,717,735

MEANS FOR LOCATING THE POSITION OF A MOBILE CRAFT

David G. C. Luck, Princeton, N. J., assignor to Radio Corporation of America, a corporation of Delaware Application June 30, 1953, Serial No. 365,007

6 Claims. (Cl. 235—61)

This invention relates to radio navigation systems useful in air navigation and is related to my copending application filed concurrently herewith, Serial No. 365,217, filed June 30, 1953. The present invention relates particularly to improved methods of and means for utilizing directional signals radiated by a pair of spaced omnidirectional radio range stations for automatically determining the position of a mobile craft receiving the directional signals transmitted by both stations. The positional data herein provided is given a rectangular coordinate form and is referenced with respect to an en-route flight point which is selectable at will.

Heretofore when a pilot or navigator desired to obtain a "fix" on the position of his craft frequently it has been necessary either to use trigonometric methods, making computations thereby, or to construct intersecting azimuths graphically. Such arrangements are not desirable, particularly in small craft, since these functions usually are performed by the pilot and may distract his attention from other required activities. More recently it has been proposed to automatically locate a craft's position by combining omni bearing data with range data derived from radar distance measuring equipment (DME). However, the latter method requires that the mobile craft carry not only omni and radar receiving equipment but also that it carry a radar transmitter.

While the omni-DME position determining method affords the desired information, the method has some disadvantages. The additional equipment required (i. e., the radar transmitter and receiver) is rather complex and is expensive, heavy, and bulky. The weight and cost factors are not advantageous insofar as the adoption of the method by owners of small or light aircraft is concerned and may be restrictive even for commercial airline navigation purposes.

An object of the instant invention is to provide improved methods and means for automatically enabling a mobile craft to ascertain its position.

Another object of the invention is to provide methods and means for utilizing directional signals radiated by a pair of spaced omni stations for determining the position of a mobile craft receiving the directional signals.

Another object of the invention is to provide improved apparatus to be carried by a mobile craft for enabling the craft to determine its positional location.

Another object of the invention is to provide apparatus of the above type which is especially suitable for use by light aircraft.

A further object is to simplify the equipment carried by a mobile craft and used for determining its position.

A further object of the invention is to reduce the size and weight of equipment used by a mobile craft for "fixing" its position.

A still further object of the invention is to provide omnirange radio navigation system apparatus for providing data in rectangular coordinate form for automatically enabling a mobile craft to determine its position with respect to selected en-route flight points.

A still further object of the invention is to provide improved and simplified computing apparatus for utilizing directional signals radiated by spaced omnirange stations for enabling a mobile craft carrying the apparatus to determine its position.

According to the present invention improved methods and means are hereinafter disclosed and claimed for automatically locating the position of a mobile craft. The instant apparatus includes an omnirange navigation system receiver and relatively simple computer means associated therewith but does not require the radar transmitter-receiver apparatus heretofore mentioned. The heavy and costly radar apparatus has been replaced with a simple and inexpensive computer mechanism which provides substantially the same information afforded by the omni-DME combination. Moreover, the present system is suitable and adapted for use by light as well as heavy aircraft.

According to the invention, directional signals radiated by a pair of spaced omni stations are received at a given mobile craft and are translated into different mechanical shaft rotations, the angular displacement of each shaft being proportional to the bearing of the craft with respect to each omni station. The shaft motion data and other predetermined data are applied to a novel computer. In the computer the data are combined to provide the location of the craft with respect to a selected point which may lie along the chosen flight path. The location of the craft with respect to the chosen point is given in rectangular coordinate form with the chosen point selectable at will and the coordinate axes orientable at will. The positional information thus provided may be conveniently used for navigating to and from locations not equipped with radio facilities, rather than referenced with respect to the position of one of the ground stations (which may be irrelevantly located insofar as the planned flight path of the craft is concerned).

The invention will be described in detail with reference to the accompanying drawing in which:

Figure 1 is a diagram illustrating the position of a mobile craft with respect to a pair of spaced omni-range radio range stations and a selected reference point; and Figures 2 and 3 are schematic circuit diagrams of omnirange radio receiving and computing apparatus, according to the invention, for enabling the mobile craft of Figure 1 to automatically determine its position.

Similar reference characters are applied to similar elements throughout the drawings.

*Derivation of equation to be solved*

Referring to Figure 1 of the drawing, a westerly omnirange station $S_1$ and an easterly omnirange station $S_2$ are located at the positions indicated. The baseline extending between the stations $S_1$ and $S_2$ is of length B and is oriented at $\alpha_1$ degrees from north of station $S_1$ and $\alpha_2$ degrees from north of station $S_2$. An aircraft is shown at point Z located a distance $r$ from station $S_1$, bearing $\beta_1$ degrees from station $S_1$, and bearing $\beta_2$ degrees from station $S_2$.

It often is desirable to fix the position of the craft in rectangular coordinates referred to some point along the chosen flight path. In the present example this "way-point" is selectable at will and is designated as point O. The X and Y coordinate axes through point O also are orientable at will with $\gamma$ being the angle between north and the X axis.

In the triangle defined by $S_1ZS_2$ and having interior angles $\theta_1$, $\theta_2$, and $\theta_3$, by the law of sines $$\frac{r}{\sin \theta_2} = \frac{B}{\sin \theta_3} \qquad (1)$$

Since $\theta_1 = \alpha_1 - \beta_1$, $\theta_2 = \beta_2 - \alpha_2$, and $\theta_1 + \theta_2 + \theta_3 = 180°$, then $\theta_3 = 180° - (\theta_1 + \theta_2) = \beta_1 - \beta_2 + \alpha_2 - \alpha_1 + 180°$. Because stations $S_1$ and $S_2$ are spaced apart distance B and there is a convergence of meridians and a difference of magnetic declinations for the two stations, $\alpha_2 = \alpha_1 + 180° + \delta$, $\delta$ being the angular difference between the north reference direction at station $S_1$ and the north reference direction at station $S_2$.

For the sake of simplicity the small correction $\delta$ will be neglected in this part of the discussion. Thus $$\sin \theta_3 = \sin(\beta_1 - \beta_2 + 360°) = \sin(\beta_1 - \beta_2)$$

and equation (1) becomes $$r = \frac{\sin(\alpha_1 - \beta_2)}{\sin(\beta_1 - \beta_2)} B \quad (2)$$

In the rectangular coordinate system referenced on point O $$X - X_0 = r \cos(\gamma - \beta_1) \quad (3)$$

and $$Y - Y_0 = r \sin(\gamma - \beta_1) \quad (4)$$

where X and Y are the coordinates of point Z and $X_0$ and $Y_0$ are the coordinates of station $S_1$.

Substituting $r$ from Equation (2) in Equations (3) and (4) and with further mathematical treatment $$(X - X_0) \sin(\beta_1 - \beta_2) - \frac{B}{2} \sin(\beta_1 - \beta_2 + \alpha_1 - \gamma) - \frac{B}{2} \sin(\beta_1 + \beta_2 - \alpha_1 - \gamma) = 0 \quad (5)$$

and $$(Y - Y_0) \sin(\beta_1 - \beta_2) - \frac{B}{2} \cos(\beta_1 + \beta_2 + \alpha_1 - \gamma) + \frac{B}{2} \cos(\beta_1 + \beta_2 - \alpha_1 - \gamma) = 0 \quad (6)$$

Equations (5) and (6) are the conversion equations which are to be mechanized in accordance with the invention. In these equations $\alpha_1$, $\gamma$, $X_0$, $Y_0$, and B are known quantities, all fixed for any one problem, and $\beta_1$ and $\beta_2$ are variables which vary in accordance with and depend upon the instantaneous in-flight position of the aircraft shown at point Z. In Figures 2 and 3 typical apparatus is shown, according to the invention, for use aboard the mobile aircraft. The apparatus mechanizes the conversion equations to provide the instantaneous values of X and Y and hence determines the craft's position.

*Proportional shaft rotation*

Referring to Figure 2, directional signals radiated by station $S_1$ are intercepted by an antenna 11 which is coupled to the input circuits of an omnirange receiver A tuned to receive the signals. The radiated signals comprise (1) a directional signal rotating at thirty revolutions per second, perceived as amplitude modulation of a received VHF carrier with modulation phase dependent on receiver azimuth, and (2) a thirty cycle per second reference phase signal frequency-modulating a 9.96 kilocycle subcarrier which in turn amplitude-modulates an omni-directionally radiated VHF carrier. In receiver A the modulated carrier waves are amplified, demodulated, and a pair of thirty cycle per second signals (a reference phase signal and a variable phase signal) are separately provided at its output terminals. The phase relation (phase difference) of the signals is proportional to the bearing $\beta_1$ of the craft at point Z from station $S_1$ with respect to true North.

One of the directional signals, for example, the variable phase signal is applied to one input of a phase comparator circuit 13 while the other signal, the reference phase signal, is applied to a phase shifter unit 15 which includes a phase splitter and a synchro resolver. The phase shifter output is applied to a second circuit input of the phase comparator 13. The output of the phase comparator 13 controls the rotation of a servomotor 17 which in turn drives the phase shifter 15. The operation of the feedback system is such that servomotor 17 drives the phase shifter 15 to introduce a phase shift which nullifies the phase difference existing between the 30 cycle per second signals appearing at the output of the omni receiver A. The servomotor shaft 19 thus takes an angular position which is directly proportional to the angular position of the aircraft at point Z from station $S_1$ with respect to North.

In substantially the same manner described above directional signals radiated by station $S_2$ are intercepted by antenna 21 and applied to omni receiver B which is tuned to a frequency band different from that to which receiver A is tuned. In receiver B the directional signals are amplified, demodulated, and are separated to reproduce the 30 cycle per second modulation signals. In this instance the phase relation of the reference and variable phase signals is proportional to the bearing ($\beta_2$) of the craft at point Z from station $S_2$ with respect to North. A phase comparator 23, a servomotor 27, and a phase shifter 25 are connected in a feedback loop with receiver B in the manner described above with reference to receiver A and its associated circuitry so that the shaft 29 of servomotor 25 assumes an angular position proportional to the angular position of the craft at Z from station $S_2$ with respect to North.

*Rectangular coordinate computing mechanism*

Referring to Figure 3, the rotations of shafts 19 and 29 (proportional to $\beta_1$ and $\beta_2$, respectively) are separately combined in mechanical differentials 31 and 33. In differential 31 the shaft motions are added together to impart rotation to shaft 35 which is proportional to $\beta_1 + \beta_2$. In differential 33 the shaft motions are subtracted from each other to impart a rotation to shaft 37 which is proportional to $\beta_1 - \beta_2$.

The $\beta_1 + \beta_2$ rotation of shaft 35 is transmitted to a mechanical differential 39 wherein $\alpha_1 + \gamma$ (a hand-set quantity) is subtracted therefrom. Output shaft 41 of differential 39 thus is angularly displaced an amount proportional to $\beta_1 + \beta_2 - \alpha_1 - \gamma$.

Shaft 37 (having an angular displacement proportional to $\beta_1 - \beta_2$) is mechanically coupled to two computer elements. In one instance it drives the rotor 43 of a single rotor-double stator resolver 45. In the other instance the $\beta_1 - \beta_2$ rotation of the shaft 37 is transmitted to a mechanical differential 47. In differential 47 the quantity $\alpha_1 - \gamma$ is added to $\beta_1 - \beta_2$ and shaft 49 assumes an angular position proportional to $\beta_1 - \beta_2 + \alpha_1 - \gamma$. The quantities $\alpha_1 + \gamma$ and $\alpha_1 - \gamma$ have been shown in the drawing as set into the computer by handcranks 51 and 53. It will be recognized, however, that the $\alpha_1 + \gamma$ and $\alpha_1 - \gamma$ quantities may be derived by adding together or subtracting the $\alpha_1$ and $\gamma$ quantities in other mechanical differentials (not shown). For the sake of simplicity this additional structure is not shown herein.

An alternating current source 67 applies a reference voltage across a potentiometer 69 having a movable arm 71. The position of the potentiometer arm 71 is determined by the length of baseline B and is pre-set into the computer by means of a handcrank 73. The voltage available at the arm 71 is proportional to B and is used to supply excitation current to the stator windings of resolvers 63 and 65. The impedance values of these resolvers are so related to the impedance of the potentiometer 69 that the voltage available at the tap 71 is not significantly affected by the current supplied to the resolvers. The source 67 also utilizes the reference voltage to excite the stator windings of the resolver 45.

Shafts 41 and 49 drive the rotors 55, 57 and 59, 61 of resolvers 63 and 65, so that the output voltages produced thereby are $$+\frac{B}{2} \cos (\beta_1+\beta_2-\alpha_1-\gamma)$$

$$-\frac{B}{2} \sin (\beta_1+\beta_2-\alpha_1-\gamma)$$

$$-\frac{B}{2} \cos (\beta_1-\beta_2+\alpha_1-\gamma)$$

and $$-\frac{B}{2} \sin (\beta_1-\beta_2+\alpha_1-\gamma)$$

respectively.

Shaft 37 similarly drives the rotor 43 of resolver 45. The voltage produced by the rotor 43 is then $+\sin(\beta_1-\beta_2)$. This voltage is applied to a pair of parallel connected center-tapped potentiometers 77 and 79.

The voltage available between the arm 81 of potentiometer 77 and its center-tap, the voltage produced by rotor winding 57

$$\left(+\frac{B}{2} \sin (\beta_1+\beta_2-\alpha_1-\gamma)\right)$$

and the voltage produced by rotor winding 61

$$\left(-\frac{B}{2} \sin (\beta_1-\beta_2+\alpha_1-\gamma)\right)$$

are added by series connection to provide a control voltage signal for the servo amplifier of the servo unit 75. This voltage is applied to the servo unit via leads 105 and 106. The source 67 provides a polarity reference signal for the servo unit 75 via a direct connection 104. The servomotor of the unit 75 runs to reduce the above mentioned control voltage to zero volts. The servomotor output shaft 83 has motion $X_o$ (set into the computer by handcrank 87) subtracted from its motion in a mechanical differential 85. The remainder motion $(X-X_o)$ is imparted to shaft 87 which drives the arm 81 of potentiometer 77.

Reference to Equation (5) indicates that the control voltage available between leads 105 and 106 becomes zero when the voltage on potentiometer arm 81 becomes $(X-X_o) \sin (\beta_1-\beta_2)$. Therefore the servomotor runs until the position of shaft 83 represents coordinate distance X.

The coordinate distance Y is produced in a manner substantially identical to that employed above in solving for X. The voltage available between the arm 93 of potentiometer 79 and its center-tap, the voltage produced by rotor winding 55

$$\left(+\frac{B}{2} \cos (\beta_1+\beta_2-\alpha_1-\gamma)\right)$$

and the voltage produced by rotor winding 59

$$\left(-\frac{B}{2} \cos (\beta_1-\beta_2+\alpha_1-\gamma)\right)$$

are added to provide a control voltage signal for the servo amplifier of a servo unit 91. A polarity reference signal is provided for the servo unit 91 by the A.-C. source 67. The servomotor of the unit 91 runs to reduce this control voltage to zero volts. Its shaft 95 has motion $Y_o$ (set into the computer by handcrank 99) subtracted from its motion in mechanical differential 97. The remainder motion $(Y-Y_o)$ is imparted to shaft 101 which drives the arm 93 of potentiometer 99. The control voltage applied to the servo unit 91 becomes zero when the voltage on potentiometer arm 93 becomes $(Y-Y_o) \sin (\beta_1-\beta_2)$. The position of shaft 95 then represents coordinate distance Y.

The correction factor $\delta$, mentioned previously, may be introduced into the computer if such correction is required. The correction may be made therefor by imparting to shaft 29 an incremental rotation which is proportional to $\delta$. As indicated herein this correction is desirable when there is an appreciable convergence of meridians and/or difference in magnetic declinations for stations $S_1$ and $S_2$.

The above-described computer thus provides automatic means for obtaining a fix of the position of a mobile craft. The fix is given in rectangular coordinates referenced with respect to a waypoint location which is selectable at will. The variable quantities fed into the computing apparatus are the $\beta_1$ and $\beta_2$ bearing data from range stations $S_1$ and $S_2$. All other data set into the computer is known in advance and may be pre-set.

As well known in the art $\beta_1$ and $\beta_2$ alternatively may be obtained from bearings taken on non-directional stations at $S_1$ and $S_2$ by automatic direction finders on the mobile craft with north reference given by the magnetic compass on the craft.

While the foregoing description has been directed to the use of separate omni receivers for receiving the directional signals radiated by the two omni stations, the invention is not so limited. A single omni receiver may be used with equal facility with provisions for switch-tuning the receiver to receive alternately the signals from both stations.

What is claimed is:

1. For use in a system in which directional navigation signals are radiated by a plurality of spaced transmitting stations, and including receiving apparatus for use on board a mobile craft for receiving and translating directional signals radiated by two of said stations into different quantities representative of the azimuth bearings of said craft with respect to said two stations; apparatus comprising a computer including, means for accepting said different quantities as computer inputs, means for producing an additional computer input proportional to the azimuth bearing of an imaginary line extending from one of said two stations to the other of said two stations, means for producing a further input proportional to the length of said imaginary line, means for producing computer inputs representative of the location of a point which is selectable at will with respect to the location of said two transmitting stations, and means for combining functions of said inputs to produce outputs which are proportional to the distance of said mobile craft from said point.

2. For use in a system in which directional navigation signals are radiated by a plurality of spaced transmitting stations, and including receiving apparatus for use on board a mobile craft for receiving and translating directional signals radiated by two of said stations into different quantities representative of the azimuth bearings of said craft with respect to said two stations; apparatus comprising a computer including, means for accepting said different quantities as computer inputs, means for producing computer inputs representative of the location of a point which is selectable at will and through which pass rectangular coordinate axes which are orientable at will, means for deriving a computer input which is proportional to the orientation of said axes, means for producing an input proportional to the azimuth bearing of an imaginary line extending from one of said two stations to the other of said two stations, means for producing an input proportional to the length of said imaginary line, and means for combining functions of said inputs to produce outputs which are proportional to the rectangular coordinates of the position of said craft with respect to said point.

3. For use in a system in which directional navigation signals are radiated by a plurality of spaced transmitting stations, and including receiving apparatus for use on board a mobile craft for receiving and translating directional signals radiated by two of said stations into first and second quantities representative of the azimuth bearings of said craft with respect to said two stations; apparatus comprising a computer including, means for accepting said first and second quantities as computer inputs, means for producing a third quantity for use as a computer input which is proportional to the azimuth bearing of an imaginary line extending from one of said two stations to the other of said two stations, means for adding said first input quantity to said second input quantity, means for subtracting said second input quantity from said first input quantity, means for subtracting said third input quantity from said added first and second input quantities to produce a fourth quantity, means for adding said third quantity to said subtracted first and second quantities to produce a fifth quantity, means for multiplying functions of each of said fourth and fifth quantities by a sixth quantity which is proportional to the length of said imaginary line, means for producing seventh and eight quantities as computer inputs proportional to the rectangular coordinate distances of one of said transmitting stations with respect to a point which is selectable at will, means for subtracting said seventh and eighth quantities from unknown X and Y quantities representive of the rectangular coordinate distances of said mobile craft from said point, and means for combining functions of said last named subtracted inputs and functions of said multiplied fourth and fifth inputs to provide said X and Y coordinate distances.

4. For use in a system in which directional navigation signals are radiated by a plurality of spaced transmitting stations, apparatus for use on board a mobile craft for enabling the craft to determine its position comprising, means for receiving directional signals radiated by two of said transmitting stations, means coupled to said receiving means for translating said received directional signals into different quantities representative of the azimuth bearings of said craft with respect to said stations, a computer including, means for accepting said different quantities as computer inputs, means for producing an additional computer input proportional to the azimuth bearing of an imaginary line extending from one of said two stations to the other of said two stations, means for producing a further input proportional to the length of said imaginary line, means for producing computer inputs representative of the location of a point which is selectable at will with respect to the location of said two transmitting stations, and means for combining functions of said inputs to produce outputs which are proportional to the distance of said mobile craft from said point.

5. For use in a system in which directional navigation signals are radiated by a plurality of spaced transmitting stations, apparatus for use on board a mobile craft for enabling the craft to determine its position comprising, means for receiving directional signals radiated by two of said transmitting stations, means coupled to said receiving means for translating said received directional signals into different quantities representative of the azimuth bearings of said craft with respect to said station, a computer including, means for accepting said different quantities as computer inputs, means for producing computer inputs representative of the location with respect to one of said two stations of a point which is selectable at will and through which pass rectangular coordinate axes which are orientable at will, means for deriving a computer input which is proportional to the orientation of said axes, means for producing an input proportional to the azimuth bearing of an imaginary line extending from one of said two stations to the other of said two stations, means for producing an input proportional to the length of said imaginary line, and means for combining functions of said inputs to produce outputs which are proportional to the rectangular coordinates of the position of said craft with respect to said point.

6. For use in a system in which directional navigational signals are radiated by a plurality of spaced transmitting stations, and including receiving apparatus for use on board a mobile craft for receiving and translating directional signals radiated by two of said stations into first and second quantities representative of the azimuth bearings of said craft with respect to said two stations; apparatus comprising a computer including, means for accepting said first and second quantities as computer inputs, means for producing a third quantity for use as a computer input which is proportional to the azimuth bearing of an imaginary line extending from one of said two stations to the other of said two stations, means for adding said first input quantity to said second input quantity, means for subtracting said second input quantity from said first input quantity, means for subtracting said third input quantity from said added first and second input quantities to produce a fourth quantity, means for adding said third quantity to said subtracted first and second quantities to produce a fifth quantity, means for multiplying functions of each of said fourth and fifth quantities by a sixth quantity which is proportional to the length of said imaginary line, means for producing seventh and eighth quantities as computer inputs proportional to the rectangular coordinate distances of one of said transmitting stations with respect to a point which is selectable at will, means for subtracting said seventh and eighth quantities from unknown X and Y quantities representative of the rectangular coordinate distances of said mobile craft from said point to produce ninth and tenth quantities, means for multiplying said ninth and tenth quantities by a function of said subtracted first and second input quantities, means for combining said last named multiplied quantities with said multiplied quantities obtained from said fourth, fifth, and sixth quantities, and feedback means for determining from said combined quantities the values of said unknown X and Y coordinate distances.

References Cited in the file of this patent

UNITED STATES PATENTS

| | | |
|---|---|---|
| 2,115,568 | Becker | Apr. 26, 1938 |
| 2,530,428 | Gray | Nov. 21, 1950 |
| 2,569,328 | Omberg | Sept. 25, 1951 |
| 2,599,889 | Biggs et al. | June 10, 1952 |
| 2,636,167 | Schuck | Apr. 31, 1953 |